United States Patent [19]

Aknar et al.

[11] Patent Number: 4,951,147

[45] Date of Patent: Aug. 21, 1990

[54] DIGITAL IMAGE ACQUISITION SYSTEM

[75] Inventors: Atila Aknar, Auburn; Andre Soussa, Mascot, both of Australia

[73] Assignee: Zone Technology Pty. Limited, Bankstown, Australia

[21] Appl. No.: 387,450

[22] Filed: Jul. 31, 1989

Related U.S. Application Data

[63] Continuation of Ser. No. 242,189, filed as PCT AU87/00383 on Nov. 16, 1987, published as WO88/04082 on Jun. 2, 1988, abandoned.

[30] Foreign Application Priority Data

Nov. 25, 1986 [AU] Australia .............................. PH9145

[51] Int. Cl.[5] .............................................. H04N 5/30

[52] U.S. Cl. ..................................... 358/209; 358/108

[58] Field of Search .............. 358/105, 213.11, 213.19, 358/909, 213.26, 228, 209, 108, 212; 382/50

[56] References Cited

U.S. PATENT DOCUMENTS

| | | | |
|---|---|---|---|
| 4,047,152 | 9/1977 | Guiliano et al. | 382/50 |
| 4,064,533 | 12/1977 | Lampe et al. | 549/419 |
| 4,441,125 | 3/1984 | Parkinson | 358/213.11 |
| 4,511,886 | 4/1985 | Rodriguez | 358/108 |
| 4,603,354 | 7/1986 | Hashimoto et al. | 358/212 |
| 4,673,974 | 6/1987 | Ito et al. | 358/108 |
| 4,697,425 | 9/1987 | Kara et al. | 358/212 |
| 4,755,880 | 7/1988 | Haenel et al. | 358/213.11 |
| 4,758,883 | 7/1988 | Kawahara et al. | 358/209 |

FOREIGN PATENT DOCUMENTS

| | | |
|---|---|---|
| 0148642 | 7/1985 | European Pat. Off. . |
| 0168267 | 1/1986 | European Pat. Off. . |

*Primary Examiner*—Stephen Brinich

*Attorney, Agent, or Firm*—Oblon, Spivak, McClelland, Maier & Neustadt

[57] ABSTRACT

A method and device utilizing a dynamic random access memory (RAM) image sensor which has a transparent window through which a lens can focus an image on an array of radiation sensitive cells of the dynamic RAM. The cells of the dynamic RAM are set to a fully charged state. The dynamic RAM is scanned in a sequence of steps for purposes of providing a series of images of variable exposure lengths. These series of images of variable exposure lengths are then stored in a memory. The series of images of variable exposure lengths are processed to provide a resultant single frame of image which has a plurality of intensity levels and the resultant single frame of image is then stored.

13 Claims, 8 Drawing Sheets

DIGITAL IMAGE ACQUISITION SYSTEM

This application is a continuation of application Ser. No. 242,189, filed as PCT AU87/00383 on Nov. 16, 1987, published as WO88/04082 on Jun. 2, 1988, now abandoned.

TECHNICAL FIELD

The present invention relates to an imaging system, and in particular to an imaging system employing an "intelligent" camera. The intelligent camera can be used with a dynamic RAM acting as an image sensor. The dynamic RAM image sensor enables a fully digital system to be implemented.

There are a variety of situations in which an imaging system can be employed. These range from security systems through to robotic systems. In general any imaging system in which an image needs to be transmitted to a central or alternative location can employ the present invention.

BACKGROUND ART

In known systems, for example closed circuit television systems, a camera unit such as a vidicon captures the image and then transmits it in analogue form to a station via coaxial cable Any processing that needs to be performed is usually done at the station. This is at a normally remote central location where with the provision of an analogue to digital converter (ADC) and computer any necessary processing functions are performed. The output from the camera may also be converted into digital form before being transmitted over the communication link. The bandwidth of the communication link places a further limitation and expense on this type of system.

It is also known to use motion detection software or hardware in security systems to indicate the presence of an intruder or of some disturbance in a given observed space. These know systems generally employ a remote camera which communicates via a communication link with a central observation and processing facility. The central processing facility performs the motion detection with a computer. The communication bandwidth required between the camera and the facility may need to be of the order of several MHz to provide analysis in real time as required for these types of situations. In addition available cameras only provide an analogue output requiring an analogue to digital converter to provide the digital format needed for processing by the computer.

A known imaging device which provides a digital output is a dynamic RAM having a transparent window as disclosed in U.S. Pat. No. 4,441,125 to Parkinson. This image sensor uses the light sensitive semi-conductor memory elements of the dynamic RAM to provide a black and white image or it can be employed to provide a variable grey scale output. This image sensor has been described for use in low cost applications such as robots and toys. It is much cheaper and of small size compared with other imaging devices such as vidicons and CCDs (charged coupled devices). The Parkinson specification describes various modes for operating the dynamic RAM as an image sensor. The sensitivity of the sensor can be controlled by varying the rate of scanning of the array or by changing the threshold value for the determination of the logic state of the cells of the RAM. By scanning the cells with a threshold value which follows a repeating sequence of voltage steps shades of grey can be determined for an image. This can also be achieved by scanning the cell arrays at various rates (periods).

DISCLOSURE OF INVENTION

The present invention overcomes the disadvantages in the prior art referred to above by providing a novel method of operating an image sensor employing a dynamic RAM and also an imaging unit employing a camera or imaging device which has associated with the imaging device processing capabilities giving autonomy to the actual imaging device to provide an "intelligent" camera. The intelligent camera can then be employed in a system providing intelligent bi-directional communication with a base station.

In accordance with one aspect of the invention there is provided a method of image acquisition using a dynamic random access memory (RAM) image sensor having a transparent window through which a lens can focus an image on an array of radiation sensitive cells of said dynamic RAM image sensor including the steps of: setting the cells of said dynamic RAM to a fully charged state, scanning the said image sensor to provide a series of images of variable exposure lengths, storing the said series of images of variable exposure lengths in a buffer, and processing said series of images of variable exposure lengths to provide a measure of the difference between successive scans of the imaging device to form a binary encoded intensity level for each pixel to constitute a single frame of image.

According to a further aspect of the invention there is provided an intelligent camera including optical sensor means, means for providing a digital output of said optical sensor means, means for processing said digital output and means for providing external communication of said digital output.

In a still further aspect of the invention there is provided an imaging system including an intelligent camera means, said camera means including optical sensor means, means for providing a digital output of said optical sensor means, means for processing said digital output and means for external communication of said digital output, base station means including input and output means, and means for communicating between said intelligent camera means and said base station means.

BRIEF DESCRIPTION OF DRAWINGS

A preferred embodiment of the invention will now be described in respect to the following drawings in which.

MODES FOR CARRYING OUT THE INVENTION

Figure 1:
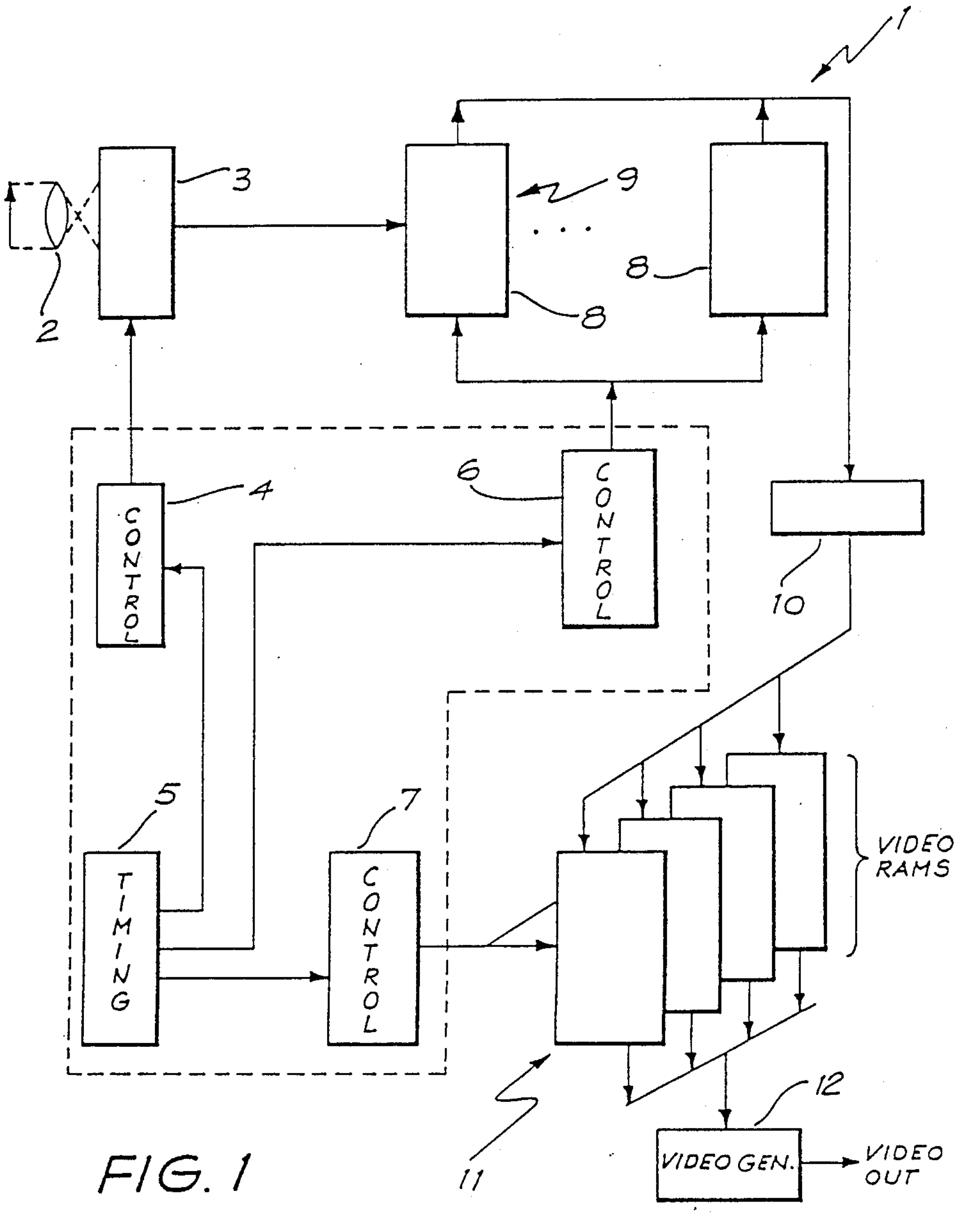
FIG. 1 is a schematic block diagram of the image sensor according to one aspect of the instant invention.

With reference to FIG. 1, an image is focused by lens 2 onto sensor 3 using a dynamic random access memory (RAM) such as disclosed in U.S. Pat. No. 4,441,125. This is scanned by interface electronics 4 to obtain an image with a plurality of intensity variations, in this case an eight level grey scale. The dynamic RAM image sensor disclosed in said U.S. specification provides an output representing either a black or white value of a bit 20 cell To provide an eight level grey scale using a 64K×1 bit dynamic RAM the sensor 3 is connected to eight 64K×1 bit dynamic RAMs 8 acting as a temporary storage buffer 9. Circuitry 6 permits a sequence of operations whereby the initial exposure of the image for a predetermined length of time is written into the first RAM 8 of the buffer 9. Subsequent exposures of varying exposure length are then written into successive remaining RAMs 8. By increasing the exposure length e.g. in a linear or geometric sequence, a series of eight levels can be derived to provide a grey scale. The exposure length and the relation between successive exposures is under software control of a microprocessor (not shown). The data stored in the temporary storage buffer 9 is then used to provide a single image frame having the desired eight possible intensity levels by these intensity levels for each pixel being then encoded as 3 bit 1's compliment binary data. This is achieved through the use of an 8 to 3 priority encoder 10. The resultant image data is then channeled to video RAMs 11 ready to be stored for further processing or to be displayed.

The video RAMs 11 consist of 12 64K×1 dynamic RAMs which are of the same type of RAM as used in the buffer 9 for temporary storage. These RAMs are arranged in a 4×3 matrix that makes it possible to store four frames with 64K image pixels where each pixel is represented by 3 bit binary data. The video RAMS can then be accessed by some external device to provide the image in a digital format. The use of the 4×3 matrix also enables further processing to be achieved by a microprocessor. This may include the detection of motion between individual frames or the processing of the image data to provide bandwidth compression.

Figure 4:
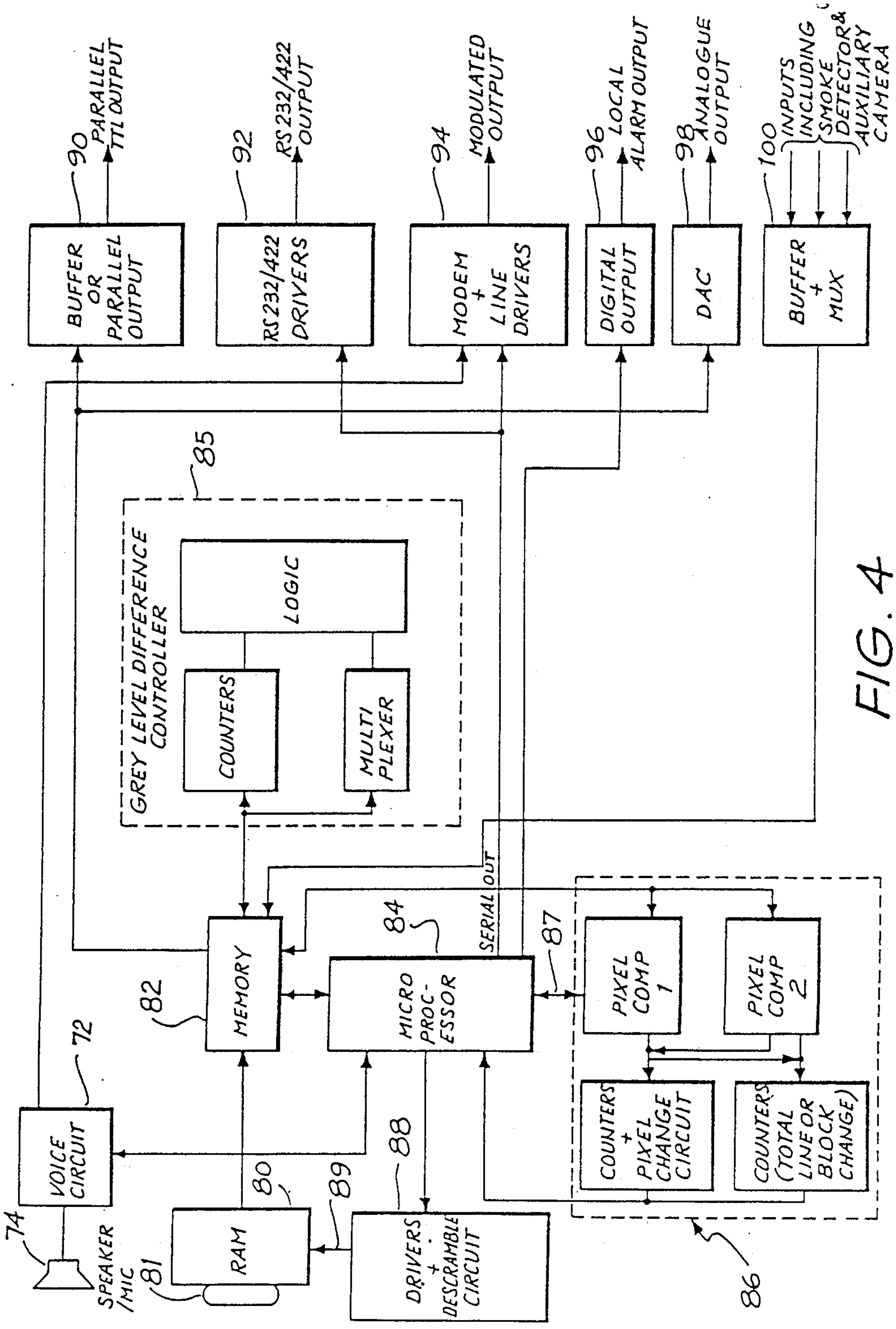

Another method of providing grey levels does not require a one-to-one relationship between the number of storage RAMs and the number of grey levels desired as described above. That is, for a 32 level grey scale, 32 64K×1 bit memory devices would be required in such a system. However, this can be reduced to 5 ($32=2^5$) 64K×1 bit RAMs by the inclusion of a grey level difference controller as shown in FIG. 4. This technique involves setting initially the levels of the memory array to all "1"s corresponding to a purely white scene. Scans are performed as in the previous technique but the binary value of each scan is now compared by the difference controller with the previous scan value for each pixel in turn to determine the difference. The appropriate binary digit in the memory array is then changed to correspond to the difference measured Thus at the end of the 32nd scan of the sensor array the memory array will reflect the determined grey level as a stored 5 bit binary number. This technique provides a saving in memory required as well as avoiding the need for a $2^n$ level to n bit encoder.

The difference controller involves counters, multiplexers and logic for which the sequence of operations is as follows. The counters initially set to all 1's are decremented with each successive scan of the image array. The scan of the image array is synchronised with the addressing of the memory element corresponding with an associated pixel of the image array. The value of the pixel read out from the image array is used to drive the $\overline{\text{Write}}$ control line of the memory array. Thus the value in the counters is written or not written depending on whether a '1' (no change) or a '0' (change) has been read from the appropriate pixel. At the end of the scan sequence (in this case) of 32 steps the memory stores the determined 32 level grey scale as a 5 bit binary value for each pixel.

As disclosed in the abovementioned U.S. patent the image sensor's sensitivity can be varied by altering the threshold value provided to the sense amplifiers of the converted memory device. Further sensitivity control can be provided by varying the scan rate. With these features and the operation of the sensor according to the present invention an image sensor with digital output having variable sensitivity and controllable intensity resolution is provided.

Figure 2:
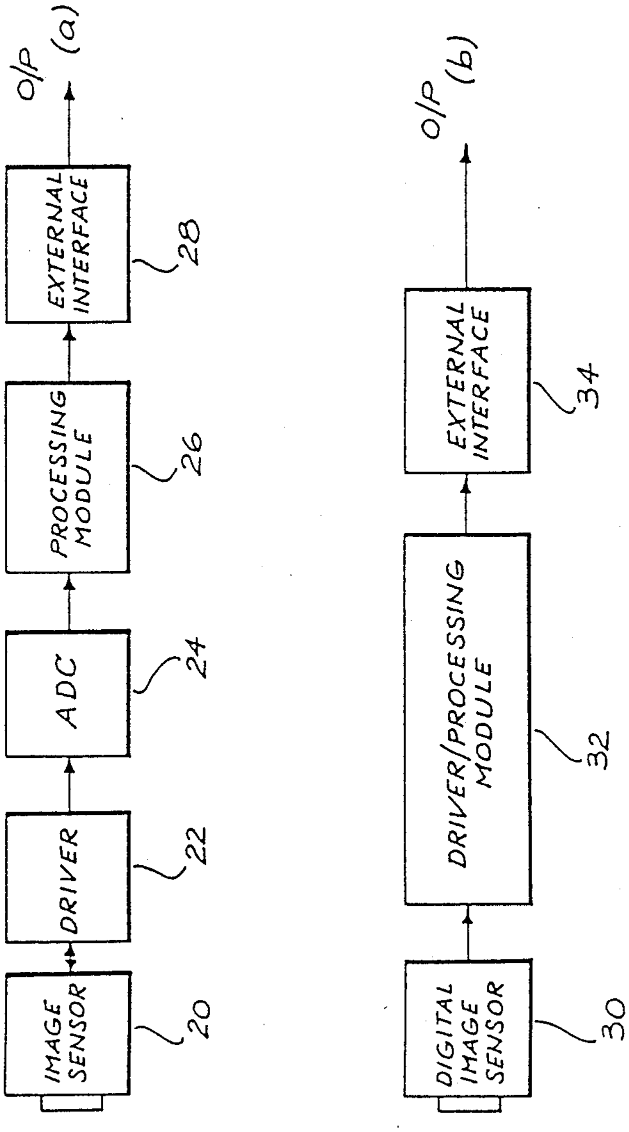
FIG. 2 (*a*) and (*b*) are schematic block diagrams of embodiments of the intelligent camera according to another aspect of the instant invention.

Block diagrams of two embodiments of an intelligent camera are shown in FIGS. 2 (*a*) and (*b*). FIG. 2(*a*) shows an analogue embodiment employing a CCD or vidicon as the imaging sensor 20, driven by driver circuitry 22. The analogue output of the camera is converted by ADC 24 into digital format for processing by module 26 which then communicates bi-directionally with the external world through interface 28.

FIG. 2(*b*) employs an image sensor 30 having a digital output such as described with reference to FIG. 1. The driver circuitry and processing module 32 are combined in a single block which can include a microprocessor and ancillary logic. Module 34 provides a bi-directional digital interface with the external world.

Figure 3:
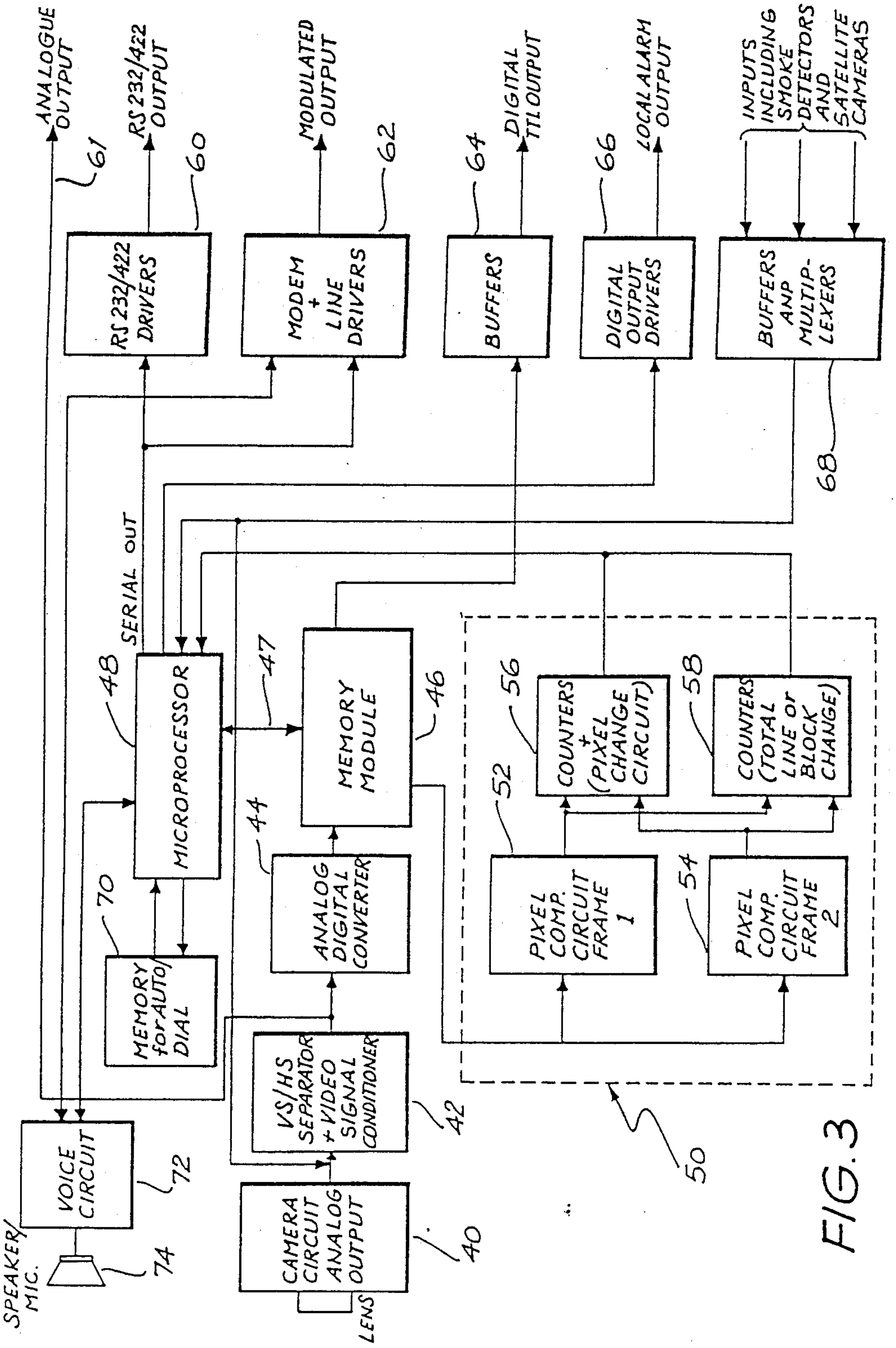
FIGS. 3 and 4 are schematic block diagrams showing more detail of FIGS. 2 (*a*) and (*b*)

FIG. 3 shows an expanded detail of the analogue embodiment of FIG. 2(*a*). A CCD camera 40 provides its analogue output to vertical/horizontal separator 42 before being fed to analogue to digital converter 44. The memory module 46 stores the digitised value of the image from camera 40. The microprocessor 48 communicates with memory 46 via bus 47. This memory module 46 stores at least two frames of the image for processing by pixel comparator circuitry 50. The image of two successive frames are fed to pixel comparators 52 and 54 respectively. These comparators 52 and 54 can compare the image on an individual pixel, line or block basis providing a tally in counters 56 and 58. The result of these comparisons can then be stored in the microprocessor 48 during the horizontal and/or vertical blanking intervals. Under the control of microprocessor 48 motion detection and adjustment of the parameters controlling the sensitivity of the comparison for ambient lighting conditions are performed.

The pixel comparator 50 operates at high speed to enable a 50 frame per second throughput. Thus it operates in real time freeing the microprocessor 48 to perform software support and the control of functions within its speed capabilities. This combination of hardware comparator 50 and microprocessor 48 provides a real time image processing environment at the camera. The microprocessor 48 performs calculations based on the parameters chosen for allowable pixel, line, or block changes as the case may be. These parameters are under software control as well as external control (via buffers and multiplexers 68).

If the microprocessor 48 detects a relevant condition e.g. movement indicating intrusion in a security environment, the microprocessor 48 can signal this fact to the external world via RS232/422 drivers 60, modem 62, buffers 64 providing a TTL (Transistor Transistor Logic, or +5V logic '1') output or output drivers 66 signalling a local alarm output. These output devices can signal the detection of an alarm condition and/or send the image as a digital output. The camera output can also be provided as an analogue signal from line 61.

The output signal can then prompt an external device (see FIGS. 5, 7 or 8) to communicate with the intelligent camera via buffers and multiplexers 68. These buffers 68 can also provide input from other sensors such as smoke detectors, pressure or contact switches, or other image sensors.

The microprocessor 48 can also control the auto dial circuitry 70 to dial up the relevant emergency utility in the event of a fire or intrusion detection.

The camera can also be provided with voice circuit 72 which provides acoustic input or output from loudspeaker and microphone 74. This acoustic input/output can be processed by microprocessor 48, for example, to detect a person's presence in a fire or input/output directly via the modem 62 to provide two way contact.

The image sensor as described with respect to FIG. 1 can be incorporated in an intelligent camera of the type shown in FIG. 2(*b*). This is shown in greater detail in FIG. 4. The digital output from the RAM image sensor 80 having an image focused thereon by lens 81, is connected to the memory module 82. The memory module 82 is connected with the microprocessor 84 and with pixel comparator 86. The pixel comparator 86 is also subject to control by the microprocessor 84 as indicated by bus 87. The microprocessor 84 can be further connected with a semi-conductor or other random access memory device or with a disk by a bus.

The microprocessor co-ordinates under software control the operation of the camera to provide various functions among which is the control of the pixel comparator which is a hardware device comprising a circuit for detecting motion operating at a higher rate than can be achieved with a microprocessor alone. The image sensor is then controlled by the drivers 88 through line 89 which in turn are controlled by the microprocessor 84 in the manner described above with respect to FIG. 1 in cooperation with grey level difference controller 85.

Circuitry 88 also includes "de-scramble" circuitry. This circuitry corrects those defects of the dynamic RAM (as an image array) such as the image being composited from two or more separate arrays, the fully charged state of cells may be a logically different value in the separate arrays requiring a logical inversion to be done and/or the arrays being non-rectilinear. In turn, the memory is connected to external buffer 90 to provide a parallel digital output or to DAC 98 to provide an analog output. A serial output is provided through Modem 94 or RS232/422 driver 92 from the microprocessor.

The operation of the intelligent camera is controlled by software which can be either self contained or modified by communication from some external source received through buffer 100.

Figure 6:
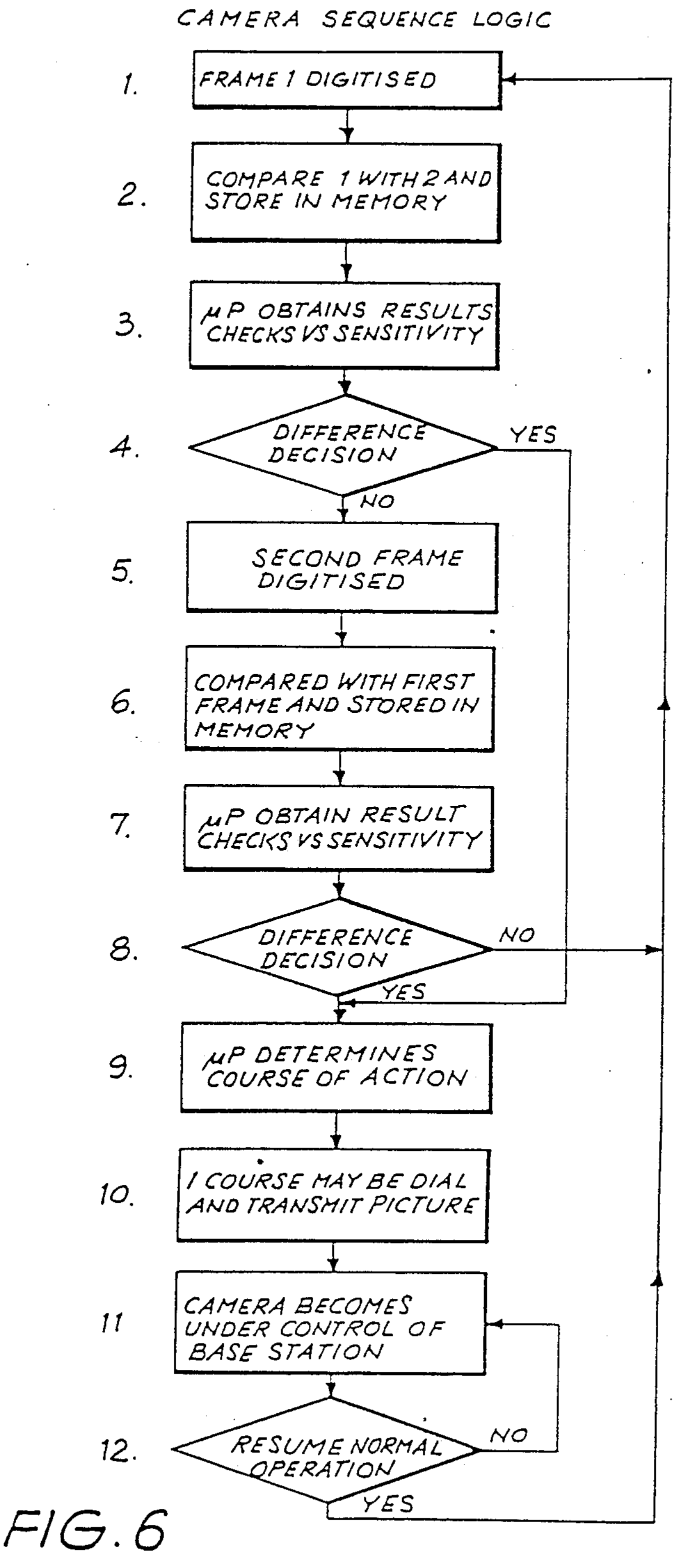
FIG. 6 is a flow chart of an embodiment of sequence logic for operation of the camera in the system of FIG. 5.

FIG. 6 shows a possible program sequence in a security environment. The logic assumes that the memory stores two frames: frame 1 and frame 2. These are written to alternatively as each new frame is generated. Frame 1 is digitised (step 1), compared with frame 2 and stored in memory (step 2). The microprocessor compares the result in comparison with the sensitivity setting chosen for the given ambient conditions e.g. a 5% charge per line (step 3). If there is any difference determined (step 4) (the YES output), the microprocessor follows the sequence of steps 9–12 otherwise the next step (step 5) is performed. This means that at "start-up" the logic will automatically indicate a difference as a frame 2 will not initially have been stored. This can be used as an operational check by the camera software and/or a base station (to be described below). Frame 2 is digitised and compared with stored frame 1 (steps 5 and 6). The microprocessor again compares the result dependent on the sensitivity (step 7). If there is any difference determined (step 8) (the YES output), the microprocessor follows the sequence of steps 9–12 otherwise the sequence of steps 1–8 are repeated based on a new frame 1.

The sequence of steps 9–12 is variable. The microprocessor determines the course of action to be taken (step 9). This can include the auto dial of a remote unit and the transmission of an alarm signal indicating that a difference has been detected (step 10). This may be followed by transmission of the last frame or could await some reply from an external "base station" to be described below. The camera can come under the control of the external base station (step 11). The camera can remain under external control (the NO output) until a decision is made to resume normal operation (the YES output) (step 12). In the latter case, operation resumes at the start of the sequence (step 1) and proceeds as before.

An intelligent camera is therefore provided, that is, an image sensor has coupled therewith processing means embodied in microprocessor and/or pixel comparator circuitry to provide a versatile and cheap component for use in such situations as security systems or other forms of surveillance, remote sensing, medical applications and the like. The inclusion of a microprocessor or the pixel comparator circuitry to provide motion detection has several advantages over anything previously done in the art.

When the camera is used as an image sensor in a security system, processing can be performed at the camera rather than as in prior art devices at some remote site so that the only need for communication is for example of a change in a scene which can be communicated over a much narrower bandwidth channel than that required for any prior art device. Thus a standard telephone line can be used using the modem output or some other narrow band channel. This in turn does not preclude the use of a channel having a much broader band of frequency such as a optical fibre or coaxial cable from being used but it provides the necessary versatility whereby the intelligent camera can be used in a variety of situations.

Figure 5:
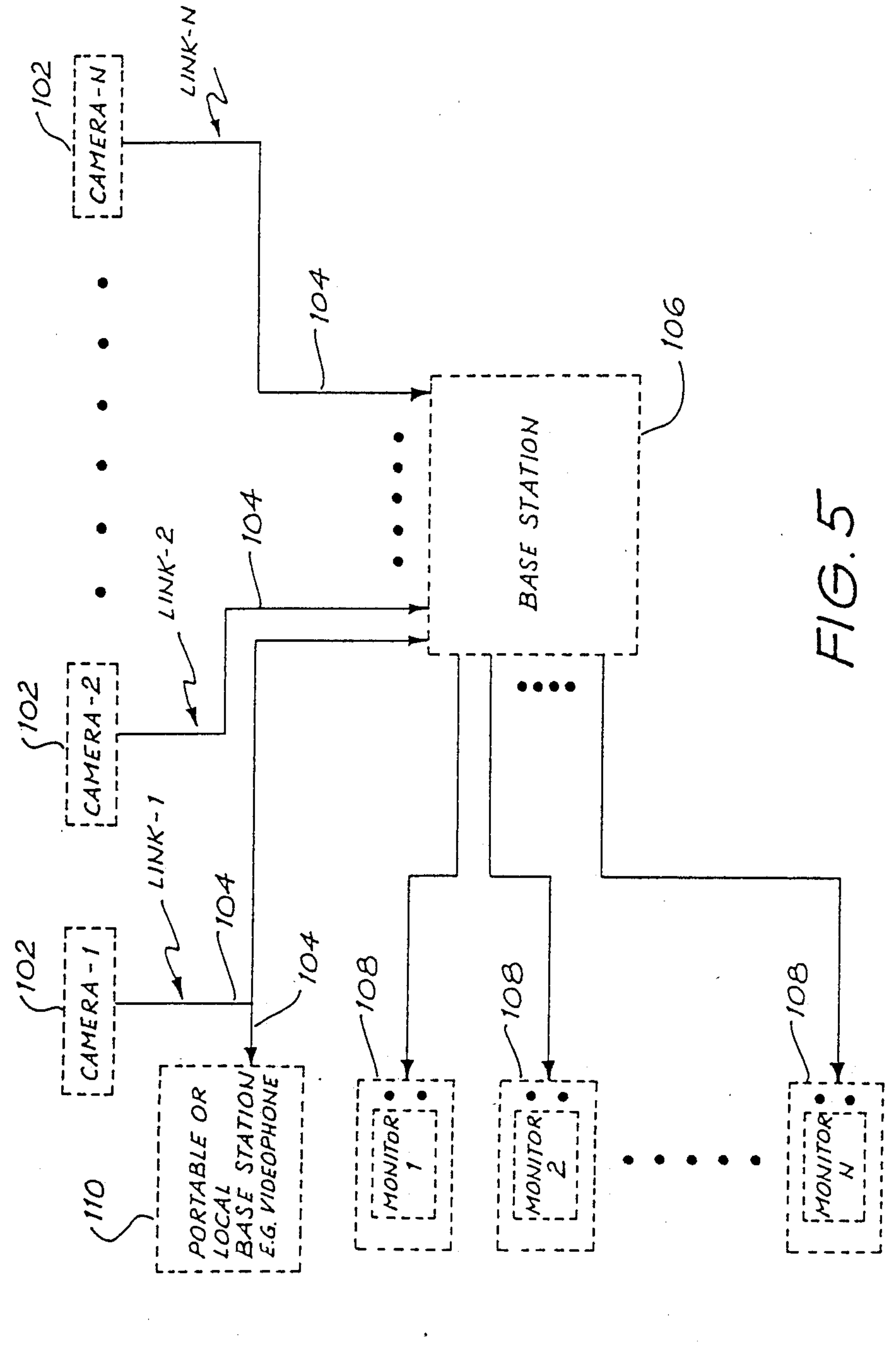
FIG. 5 is a schematic block diagram of the imaging system employing the intelligent camera of FIG. 2.
Figure 7:
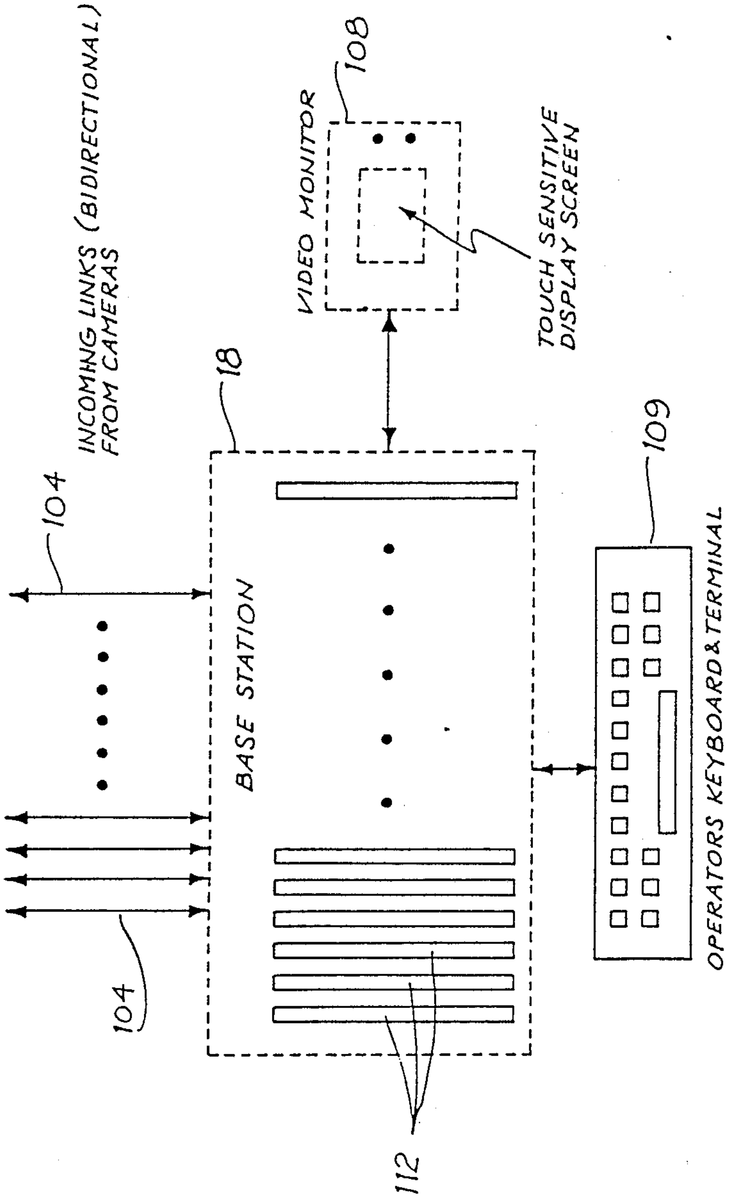
FIG. 7 is a schematic block diagram of a base station used in the system of FIG. 5.

The intelligent camera can then be incorporated in an imaging system as shown with respect to FIGS. 5 and 7 including one or more intelligent cameras 102 connected by respective bi-directional links 104 with a base station 106 which can be connected to one or more monitoring devices 108 which allow the image from the respective camera or the parameters controlling the respective camera to be displayed. The base station 106 can also be provided with an operating keyboard 109 or any similar input device as known in the art.

The base station may also be connected with a local or portable base station 110 which in combination with an intelligent camera can provide a videophone console. The link 104 between the cameras and the base station can be a 3 KHz telephone line, a 64 KHz ISDN link, an optical fibre link or a PABX or any other electromagnetic, for example radio or microwave, wireless connection. The base station 106 is made up of circuit board slots 112 carrying the necessary number of circuits to accommodate the desired capacity of the system while also providing expandability.

An operator at the base station can simply monitor the event occurring under the supervision of the remote intelligent camera or can actively intervene in the function thereof by altering the programme steps to be executed by the intelligent camera. Equally the base station could be under the control of a computer without substantial human intervention. This would depend on the application in which the system was employed.

Though a bi-directional link provides the greatest versatility this does not preclude the use of a one way link. The camera would then operate in a self-contained mode.

Figure 8:
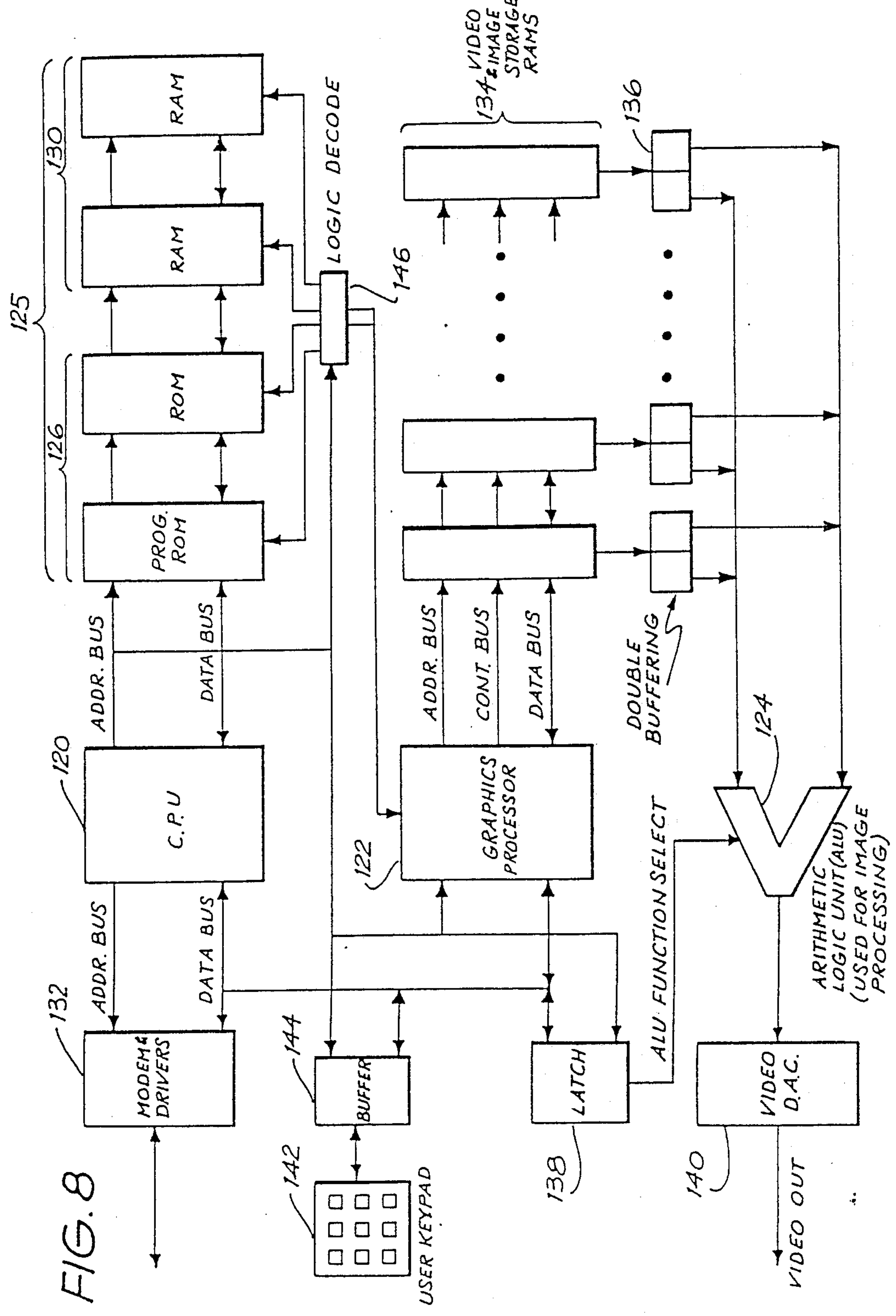
FIG. 8 is a schematic block diagram of a mobile or local base station used in the system of FIG. 5.

An expanded block diagram of a possible base station configuration is shown in FIG. 8. This is a block diagram of the mobile base station 110 of FIG. 5.

The major components of the mobile base station are central processing unit (C.P.U.) 120, graphics processor 122, and arithmetic logic unit (A.L.U.) 124. The CPU 120 communicates via address and data buses with memory 125 including program ROM 126, and RAM 130, and with modem/drivers 132. The graphics processor 122 has address, data and control buses communicating with video and image storage RAMs 134. The ALU 124 is used with the graphics processor 122 for image processing and communicates with RAMs 134 via double bi-directional buffers 136. The latch 138 controls the selection of the appropriate ALU function. The output of the ALU 124 drives video DAC 140 to provide the video output.

The user controls the operation of the mobile base station via keypad 142. The user can dial a given destination and can also perform the selection of various functions such as zoom or the inclusion of text with the image. The buffer 144 provides an interface between CPU 120, graphics processor 122, ALU 124 (via latch 138), or memory 125 (via decoding logic 146). The decoding logic 146 also provides functional control of graphics processor 122.

The base station of FIG. 8 can be then connected via link 104 with base station 106 to a complimentary base station to provide a videophone link.

The intelligent camera can be used in a security environment e.g. domestic, industrial, judicial or military. Equally the image sensor can be sensitive to other than visible radiation, for example, infrared or ultraviolet to be used in remote sensing or night vision activities. Also a low light level image sensor can be employed. With the provision of external connections available with the intelligent camera more than one image sensor can be operated from the one intelligent camera source. This would be particularly advantageous in a remote sensing environment. Here the camera could be carried on any suitable vehicle such as a space vehicle e.g. a satellite in earth orbit, an aerial conveyance e.g. aeroplane or blimp, submarine, boat or land vehicle.

By providing intelligence in the camera a cheap and efficient imaging system is provided. The number of applications for the image sensor, intelligent camera or the system incorporating the intelligent camera is quite large. Thus the above embodiments of the invention it will be understood do not restrict the spirit and scope of the invention and are by way of example only. Other embodiments would be readily apparent to those skilled in the art.

We claim:

1. A method of image acquisition using a dynamic random access memory (RAM) as an image sensor having a transparent window through which a lens can focus an image on an array of radiation sensitive cells of said dynamic RAM including the steps of:

(i) setting the cells of said dynamic RAM to a fully charged state;

(ii) scanning said image sensor to provide a series of digital images of variable exposure lengths;

(iii) storing the series of images of variable exposure lengths in a storage buffer;

(iv) processing said series of images of variable exposure lengths to provide a resultant single frame of image having a plurality of levels of intensity, and (v) storing the resultant single frame of image in a memory means.

2. A digital image sensor including:

(i) a dynamic random access memory (RAM) image sensor having a transparent window through which a lens can focus an image on an array of radiation sensitive cells of said dynamic RAM;

(ii) means for setting the cells of said dynamic RAM to a fully charged state;

(iii) means for scanning the dynamic RAM in a sequence of steps to provide a series of images of variable exposure lengths;

(iv) means for storing said series of images of variable exposure lengths;

(v) means for processing said series of images of variable exposure lengths to provide a resultant single frame of image having a plurality of intensity levels; and (vi) means for storing the resultant single frame of image.

3. A digital image sensor as claimed in claim 2 further including means for storing a plurality of frames of images.

4. A digital image acquisition system for use as a sensor at a remote location, the sensor having a degree of decision making autonomy with respect to an alternative location when linked for communication with the alternative location, the system including:

(a) an image pick-up means for converting image information to electrical frame information;

(b) storage means for storing said electrical frame information as a stored digital image;

(c) decision making means for processing the stored digital image in accordance with a predetermined decision making sequence to arrive at one of a plurality of possible conclusion signals concerning the image; and (d) communication means for enabling communication of an output from the system to the alternative location, said output being dependent on said one conclusion signal.

5. The system according to claim 4 wherein said decision making means includes a hardware comparator for comparing successive stored digital images in real time and to provide a difference signal when the compared images differ by a predetermined amount, a computer means for receiving the difference signal from said comparator and control software for operating the computer means in accordance with the predetermined decision making sequence, and to therby derive said conclusion signal from said difference signal, and to activate said communication means to enable communication of said output from the system.

6. The system according to claim 4 wherein said communication means includes an interface, a computer means operated in accordance with said decision making sequence for communicating said conclusion signal to the external world via said interface, said interface being an interface selected from the following:

(i) RS 232/422 drivers for providing a serial output from said system;

(ii) a modem for providing a modulated output suitable for transmission via the public telephone network;

(iii) an output buffer for providing a TTL output;

(iv) output drivers for signalling a local alarm output.

7. The system according to claim 6 wherein the communication means includes input means for incoming signals to the computer means.

8. An intelligent camera including a digitial image acquisition system according to any of the claims 4 to 7.

9. An intelligent camera according to claim 8 wherein said image pick-up means comprises a digital image sensor, said digital image sensor comprises:

(i) a dynamic random access memory (RAM) image sensor having a transparent window through which a lens can focus an image on an array of radiation sensitive cells of said dynamic RAM;

(ii) means for setting the cells of said dynamic RAM to a fully charge state;

(iii) means for scanning the dynamic RAM in a sequence of steps to provide a series of images of variable exposure lengths;

(iv) means for storing said series of images of variable exposure lengths;

(v) means for processing said series of images of variable exposure lengths to provide a resultant single frame of image having a plurality of intensity levels; and (vi) means for storing the resultant single frame of image.

10. An intelligent camera according to claim 8 wherein said image pick-up means comprises an analogue imaging device.

11. A surveillance system including a camera in communication with a base station, said camera having a degree of decision making autonomy with respect to the base station, the camera comprising, (a) image pick-up means for converting image information to electrical frame information;

(b) storage means for storing said electrical frame information as a stored digital image;

(c) decision making means for processing the stored digital image in accordance with a predetermined decision making sequence to arrive at one of a plurality of possible conclusion signals concerning the image; and (d) communication means for enabling communication of an output from the system to the base station, said output being dependent on said one conclusion signal.

12. A surveillance system according to claim 11 wherein said decision making sequence includes a motion detection step whereby successive stored digital images are compared and a difference signal is generated when the difference between the compared images exceeds a predetermined value, the conclusion signal being generated from the difference signal so the camera provides said output indicative of motion detection.

13. A surveillance system according to claim 11 wherein said decision making means includes a hardware comparator for comparing successive stored digital images in real time and to provide a difference signal when the compared images differ by a predetermined amount, a computer means for receiving the difference signal from said comparator and control software for operating the computer means in accordance with the predetermined decision making sequence, and to thereby derive said conclusion signal from said difference signal, and to activate said communication means to enable communication of said output from the system.

* * * * *